US011905418B2

(12) United States Patent
Daab et al.

(10) Patent No.: US 11,905,418 B2
(45) Date of Patent: Feb. 20, 2024

(54) PROCESS FOR DELAMINATION OF LAYERED SILICATES

(71) Applicant: BYK-Chemie GmbH, Wesel (DE)

(72) Inventors: Matthias Daab, Bayreuth (DE); Josef Breu, Bayreuth (DE); Andreas Edenharter, Bayreuth (DE)

(73) Assignee: BYK-Chemie GmbH, Wesel (DE)

( * ) Notice: Subject to any disclaimer, the term of this patent is extended or adjusted under 35 U.S.C. 154(b) by 862 days.

(21) Appl. No.: 16/966,924

(22) PCT Filed: Feb. 4, 2019

(86) PCT No.: PCT/EP2019/052625
§ 371 (c)(1),
(2) Date: Aug. 3, 2020

(87) PCT Pub. No.: WO2019/154757
PCT Pub. Date: Aug. 15, 2019

(65) Prior Publication Data
US 2021/0047515 A1   Feb. 18, 2021

(30) Foreign Application Priority Data

Feb. 8, 2018   (EP) ..................................... 18155816

(51) Int. Cl.
*C01B 33/40*   (2006.01)
*C01B 33/42*   (2006.01)
*C09C 1/30*   (2006.01)

(52) U.S. Cl.
CPC .......... *C09C 1/3063* (2013.01); *C01B 33/405* (2013.01); *C01B 33/425* (2013.01)

(58) Field of Classification Search
CPC . C09C 1/33063; C01B 33/405; C01B 33/425; C01B 33/44
See application file for complete search history.

(56) References Cited

U.S. PATENT DOCUMENTS

| 5,739,087 | A | 4/1998 | Dennis |
| 6,486,252 | B1 | 11/2002 | Barbee et al. |
| 7,889,534 | B2 | 2/2011 | Kim |
| 2004/0018604 | A1 | 1/2004 | Hill et al. |
| 2004/0087700 | A1 | 5/2004 | Ross et al. |
| 2004/0186041 | A1 | 9/2004 | Wenzel et al. |
| 2007/0259992 | A1 | 11/2007 | Tamura et al. |
| 2013/0035432 | A1 | 2/2013 | Breu et al. |
| 2016/0107192 | A1 | 4/2016 | Grunlan et al. |

FOREIGN PATENT DOCUMENTS

| EP | 0205281 | A2 | 12/1986 |
| EP | 3099632 | A2 | 12/2016 |
| JP | 2000-026655 | A | 1/2000 |
| JP | 2003-104719 | A | 4/2003 |
| JP | 2004-196654 | A | 7/2004 |
| JP | 5024783 | B2 | 9/2012 |

(Continued)

OTHER PUBLICATIONS

Daab, Matthias, et al. "Two-step delamination of highly charged, vermiculite-like layered silicates via ordered heterostructures." Langmuir 33.19 (2017): 4816-4822.*
Wang et al., Nanotechnology 23 (2012) 495706.
Breu et al., Chem. Mater. 2001, 13, 4213-4220.
Tyler Guin et al., "Exceptional Flame Resistance and Gas Barrier with Thick Multilayer Nanobrick Wall Thin Films," Adv. Mater. Interfaces 2015, 2, 1500214.
Fengxia Geng et al., "Unusually stable B100-fold reversible and instantaneous swelling of inorganic layered materials," Nat. Commun. 2013, 4, 1632.
Ahmet R. Mermut, G. Lagaly: "Baseline studies of the clay minerals Society sourceclays: Layer-charge determination and characteristics of those minerals containing 2:1 layers", Clays and clay minerals, vol. 49, No. 5, 2001, pp. 393-397.
T.D. Fornes, P.J. Yoon, D.L. Hunter, H. Keskkula, D.R. Paul: "Effect of organoclay structure on nylon 6 nanocomposite morphology and properties", Polymer, vol. 43, 2002, pp. 5915-5933.
P.J. Yoon, D.L. Hunter , D.R. Paul: "Polycarbonate nanocomposites, part 1. Effect of organoclay structure on morphology and properties", Polymer, vol. 44, 2003, pp. 5323-5339.
International Search Report and Written Opinion for International Patent Application No. PCT/EP2019/052625 dated May 21, 2019 (14 pages).

(Continued)

*Primary Examiner* — Richard M Rump
(74) *Attorney, Agent, or Firm* — Fitch, Even, Tabin & Flannery LLP

(57) ABSTRACT

The invention relates to a process for delamination of a layered silicate in an aqueous medium, wherein in a first step a layered silicate is treated with a delamination agent, and in a second step the thus treated layered silicate is contacted with an aqueous medium, whereby the delamination agent is a compound having exactly one positively charged atom, the positively charged atom being selected from the group consisting of nitrogen and phosphorous; contains $n_f$ functional groups selected from the group consisting of hydroxyl groups, ether groups, sulfonic acid ester groups and carboxylic acid ester groups, $n_f$ being a number from 3 to 10; comprises a total number of carbon atoms $n_c$ being from 4 to 12; has a ratio $n_c/(1+n_f)$ from 1 to 2, wherein $n_c$ is the total number of carbon atoms of the delamination agent and $n_f$ is the total number of functional groups in the delamination agent as defined under ii.; contains $n_t$ atoms selected from the group consisting of carbon, nitrogen, phosphorous, oxygen and sulfur, $n_t$ being $\geq 9$; and wherein the delamination agent is used to treat the layered silicate in an amount of at least equal to the cation exchange capacity of the layered silicate. The invention further relates to the thus produced delaminated layered silicates, their use in the production of composite and coating material and as a barrier material. Moreover, the invention relates to compositions containing the thus produced delaminated layered silicates.

16 Claims, No Drawings

(56) References Cited

FOREIGN PATENT DOCUMENTS

JP   2013-517215 A   5/2013
KR   10-2004-0055632 A   6/2004

OTHER PUBLICATIONS

Kunz et al. ACS Nano 2013, 7, 5, 4275-4280 (Year: 2013).
Simha Martynkova et al. Journal of Colloid and Interface Science 2007, 313, 281-287 (Year: 2007).
Stoter et al. Angew. Chem. Int. Ed. 2015, 54, 4963-4967 (Year: 2015).
Stoter et al. Chem. Mater. 2014, 26, 5412-5419 (Year: 2014).

* cited by examiner

PROCESS FOR DELAMINATION OF LAYERED SILICATES

The present invention relates to a process for delamination of layered silicates in an aqueous environment, the thus produced products and the use of these products as barrier material, such as a diffusion or flame-proof barrier material for various articles, and particularly in composite materials.

It is known in the prior art to add layered silicates to surface-coating compositions or composite materials. The mechanical properties of the resulting systems can be improved thereby. In particular, it is possible in that manner to increase the barrier action of a surface-coating or composite material layer.

It has been shown that the degree of improvement in the properties depends significantly on the aspect ratio of the platelets thus produced from the layered silicates. It is accordingly desirable in principle to produce platelets having a high aspect ratio, because therewith it is possible to obtain surface-coating or composite material layers which are distinguished by particularly good mechanical properties and a high barrier action. The aspect ratio is understood as being the quotient of the platelet length and the height of the platelet. Consequently, both an increase in the platelet length and a reduction in the platelet height brings about an increase in the aspect ratio. The theoretical lower limit of the platelet height of layered silicates is a single silicate lamella, which in the case of 2:1-clay materials amounts to about one nanometer.

In general, layered silicates have stacks of silicate lamellae, so-called tactoids, with heights of from several nanometers to a few millimeters.

The aspect ratio can be increased within certain limits by chemical and/or physical treatment, by cleaving the platelets along their stack axis.

The increase in the aspect ratio which accompanies an exfoliation is regarded, for example, as being an important condition to produce polymer-phyllosilicate nanocomposites having improved properties (H. A. Stretz, D. R. Paul, R. Li, H. Keskkula, P. E. Cassidy, Polymer 2005, 46, 2621-2637 and L. A. Utracki, M. Sepehr, E. Boccaleri, Polymers for Advanced Technologies 2007, 18, 1-37).

A disadvantage in the processing of known layered silicates are their in some cases contradictory properties. For example, it is known that hydrothermally produced smectites exhibit extremely good swelling behavior, because of which spontaneous exfoliation into individual silicate lamellae may be achieved. However, such smectites have small platelet diameters of about 50 nanometers, so that the aspect ratios do not exceed a value of 50.

Although natural phyllosilicates of the montmorillonite or vermiculite type exhibit platelet diameters of from several hundred nanometers to a few micrometers, spontaneous delamination does not occur. However, the aspect ratio can be increased by complex exfoliation steps.

In patent and scientific literature, the terms "delamination" and "exfoliation", with respect to the degree of separating layers of a layered silicate are not used in a consistent manner. As used herein the term "delamination" refers to separating the layers of a layered silicate into individual silicate lamellae, while "exfoliation" refers to separating of layers mainly in stacks of silicate lamellae.

The aspect ratio can either be maximized by maximizing the diameter of the platelet or by minimizing its height, or both. While the diameter of individual lamellae highly depends on the type of layered silicate and its layer charge, the height of a single silicate lamella of a 2:1-clay material is rather constant and about one nanometer as stated above. Therefore, it should always be the aim to minimize the height of platelet, i. e. to obtain individual silicate lamellae by delamination.

Therefore, it is an aim of the present invention to provide a process allowing rather a delamination of layered silicates into single lamellae than an exfoliation of the layered silicates to stacks of lamellae.

The problem is that in many known delamination procedures rather mixtures comprising single lamellae and stacks of lamellae are produced. Therefore, there is a need to provide a purposive way to delaminate layered silicates into mainly single lamellae by following simple rules in the selection of a suitable delamination agent in view of a specific layered silicate which is to be delaminated.

It is particularly difficult to delaminate such layered silicates having a heterogeneous layer charge distribution, as is the case for some naturally occurring layered silicates. While some delamination agents may be apt to delaminate layered silicates having a high layer charge the same delamination agent may fail for low layer charges. Therefore, if different regions of layer charges are present in a layered silicate, such delamination agents will fail to completely delaminate the layered silicate.

Therefore, there is a big need to provide universal delamination agents, which successfully delaminate layered silicates having regions with different layer charges from high to low layer charges.

Even if a layered silicate has a homogeneous layer charge distribution, such universal delamination agents can be advantageously used, because there is no need to know the exact layer charge of the layered silicate to be delaminated to select an appropriate delamination agent.

Furthermore, such universal delamination agent can be successfully used with mixtures of different layered silicates each having a rather homogeneous layer charge distribution, which however differs from the layer charges of the other layered silicates in the mixture. In such case a mixture comprising layered silicates having different layer charges can still be treated with one and the same delamination agent.

Therefore, it was the aim of the present invention to provide a process for delamination of a layered silicate by a universal delamination agent.

The aim of the present invention can be achieved by providing a process for delamination of a layered silicate in an aqueous medium, wherein
(A) in a first step
   a. a layered silicate is treated with
   b. a delamination agent, and
(B) in a second step
   the thus treated layered silicate obtained in the first step is contacted with an aqueous medium, characterized in that
   the delamination agent
      i. is a compound having exactly one positively charged atom, the positively charged atom being selected from the group consisting of nitrogen and phosphorous;
      ii. contains $n_f$ functional groups selected from the group consisting of hydroxyl groups, ether groups, sulfonic acid ester groups and carboxylic acid ester groups, $n_f$ being a number from 3 to 10;
      iii. comprises a total number of carbon atoms $n_c$ being from 4 to 12;
      iv. has a ratio $n_c/(1+n_f)$ from 1 to 2, wherein $n_c$ is the total number of carbon atoms of the delamination agent and $n_f$ is the total number of functional groups in the delamination agent as defined under ii.;

v. contains $n_t$ atoms selected from the group consisting of carbon, nitrogen, phosphorous, oxygen and sulfur, $n_t$ being ≥9; and wherein the delamination agent is used to treat the layered silicate in an amount of at least equal to the cation exchange capacity of the layered silicate.

The term "a layered silicate" also encompasses a mixture of layered silicates.

The suitable delamination agents are described by their chemical properties i. to iv. encompassing clear structural specifications regarding the number of positively charged nitrogen or phosphorous atoms, the occurrence of different, rather hydrophilic functional groups, their molecular size by means of the number of carbon atoms and the degree of hydrophilicity by means of a ratio of carbon atoms to hydrophilic functional groups and positively charged nitrogen or phosphorous atoms.

The above process gives the clear instruction how to obtain a reliable high degree of delamination of a layered silicate, even for layered silicates having different layer charges or regions of different layer charges within one layered silicate.

The degree of delamination preferably being ≥80 wt.-%, more preferably being ≥90 wt.-% and most preferably being ≥95 wt.-% of the total weight of treated layered silicate. The degree of delamination can be determined by using a 1 wt.-% suspension of the treated clay suspension, centrifuging the clay suspension for 6 min at 4000 g and subsequently determining the dry mass of the delaminated gel $m_d$ (in the supernatant) and the dry mass of the sediment $m_s$. The relation $m_d/(m_d+m_s)$ in percent is the degree of delamination. The dry masses are determined by drying the sample at 80° C. until no change in weight is observed.

The process for delamination of a layered silicate according to the present invention is also a process for producing individual silicate lamellae from layered silicates.

DETAILED DESCRIPTION

In the following, the present invention will be described in more detail, particularly with respect to further preferred embodiments of specific features.

Layered Silicates

Preferably the layered silicates have a layer charge $L_c$ from ≥0.25 to ≤1.0 and a charge equivalent area $A_s$=47.6 Å$^2$/(2 $L_c$). If the layer charge is heterogeneous, it is preferred if the layer charges of the different regions of layer charges within a layered silicate are in the above range. The same applies, if mixtures of different layered silicates with homogeneous but different layer charges are to be delaminated. Layer charges $L_c$ are given per formula unit (p.f.u.) of $Si_4O_{10}F_2$. $A_s$ is given in Å$^2$/charge.

Preferred layered silicates to be used in the present invention are so-called 2:1-clay minerals, particularly preferred are smectites and vermiculites.

Most preferred layered silicates as to be used in the process according to the present invention can be depicted by general formula (I)

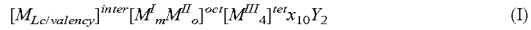  (I)

wherein,

M are metal cations of oxidation state 1 to 3;
$M^I$ are metal cations of oxidation state 2 or 3;
$M^{II}$ are metal cations of oxidation state 1 or 2;
$M^{III}$ are atoms of oxidation state 4;
X are di-anions;
Y are mono-anions;
m is ≤2.0 for metal atoms $M^I$ of oxidation state 3 and
m is ≤3.0 for metal atoms $M^I$ of oxidation state 2;
is ≤1.0; and
the layer charge $L_c$ is ≥0.25 and ≤1.0.

As generally used, the term "inter" refers to the interlayer containing the interlayer cations, "tetra" refers to the tetrahedral sheet containing the atoms having oxidation state 4 and "octa" refers to the octahedral sheet containing metal cations $M^I$ and/or $M^{II}$.

The range of the layer charge $L_c$ encompasses naturally occurring as well as synthetic layered silicates, particularly such of the smectite type ($L_c$<0.6) and vermiculite type ($L_c$ 0.6).

Synthetic layered silicates are preferably used and preferably prepared by high-temperature melt synthesis, which is optionally followed by an annealing procedure. It is also possible to carry out a layer charge reduction of the as-synthesized or as-annealed layered silicates.

M preferably has oxidation state 1 or 2. M is particularly preferably Li$^+$, Na$^+$, Mg$^{2+}$ or a mixture of two or more of those ions.

$M^I$ is preferably Mg$^{2+}$, Al$^{3+}$, Fe$^{2+}$, Fe$^{3+}$ or a mixture of two or more of those ions.

$M^{II}$ is preferably Li$^+$, Mg$^{2+}$ or a mixture of those cations.

$M^{III}$ is preferably a tetravalent silicon cation.

X is preferably O$^{2-}$,

Y is preferably OH$^-$ or F$^-$, particularly preferred F$^-$.

The layer charge $L_c$ is preferably ≥0.28 and ≤0.95, more preferred ≥0.30 and ≤0.90 and most preferred ≥0.35 and ≤0.75.

According to a particularly preferred embodiment of the invention, M is Li$^+$, Na$^+$, Mg$^{2+}$ or a mixture of two or more of those ions, $M^I$ is Mg$^{2+}$, Al$^{3+}$, Fe$^{2+}$, Fe$^{3+}$ or a mixture of two or more of those ions, $M^{II}$ is Li$^+$, Mg$^{2+}$ or a mixture of those ions, $M^{III}$ is a tetravalent silicon cation, X is O$^{2-}$ and Y is OH$^-$ or F$^-$.

The synthetic layered silicates of the formula $[M_{Lc/valency}]^{inter}[M^I_m M^{II}_o]^{oct}[M^{III}_4]^{tet}X_{10}Y_2$ can be prepared by heating compounds of the desired metals (salts, oxides, glasses) in the stoichiometric ratio in an open or closed crucible system to form a homogeneous melt and, then cooling the melt again.

In the case of synthesis in a closed crucible system there can be used as starting compounds alkali salts/alkaline earth salts, alkaline earth oxides and silicon oxides, preferably binary alkali fluorides/alkaline earth fluorides, alkaline earth oxides and silicon oxides, particularly preferably LiF, NaF, MgF$_2$, MgO, quartz.

The relative proportions of the starting compounds are then, for example, from 0.4 to 0.6 mol of F$^-$ in the form of the alkali/alkaline earth fluorides per mol of silicon dioxide and from 0.4 to 0.6 mol of alkaline earth oxide per mol of silicon dioxide, preferably from 0.45 to 0.55 mol of F$^-$ in the form of the alkali/alkaline earth fluorides per mol of silicon dioxide and from 0.45 to 0.55 mol of alkaline earth oxide per mol of silicon dioxide, particularly preferably 0.5 mol of F$^-$ in the form of the alkali/alkaline earth fluorides per mol of silicon dioxide and 0.5 mol of alkaline earth oxide per mol of silicon dioxide.

Charging of the crucible is preferably carried out in such a manner that first the more volatile substances, then the alkaline earth oxide and finally the silicon oxide are weighed in.

Typically, a high-melting crucible made of a metal that is chemically inert or slow to react, preferably of molybdenum or platinum, is used.

Before it is closed, the charged, still open crucible is preferably heated in vacuo at temperatures of from 200° C. to 1100° C., preferably from 400 to 900° C., in order to remove residual water and volatile impurities. Experimentally, the procedure is preferably such that the upper crucible edge is red-hot while the lower region of the crucible has lower temperatures.

A pre-synthesis is optionally carried out in the closed pressure-resistant crucible for from 5 to 20 minutes at from 1700 to 1900° C., particularly preferably at from 1750 to 1850° C., in order to homogenize the reaction mixture.

The heating and the pre-synthesis are typically carried out in a high-frequency induction furnace. The crucible is protected from oxidation by a protecting atmosphere (e.g. argon), reduced pressure or a combination of both measures.

The main synthesis is carried out with a temperature program that is adapted to the material. This synthesis step is preferably carried out in a rotary graphite furnace with horizontal orientation of the axis of rotation. In a first heating step, the temperature is increased from room temperature to from 1600 to 1900° C., preferably from 1700 to 1800° C., at a heating rate of from 1 to 50° C./minute, preferably from 10 to 20° C./minute. In a second step, heating is carried out at from 1600 to 1900° C., preferably from 1700 to 1800° C. The heating phase of the second step lasts preferably from 10 to 240 minutes, particularly preferably from 30 to 120 minutes. In a third step, the temperature is lowered to a value of from 1100 to 1500° C., preferably from 1200 to 1400° C., at a cooling rate of from 10 to 100° C./minute, preferably from 30 to 80° C./minute. In a fourth step, the temperature is lowered to a value of from 1200 to 900° C., preferably from 1100 to 1000° C., at a cooling rate of from 0.5 to 30° C./minute, preferably from 1 to 20° C./minute. The reduction in the heating rate after the fourth step to room temperature takes place, for example, at a rate of from 0.1 to 100° C./minute, preferably in an uncontrolled manner by switching off the furnace.

The procedure is typically carried out under protecting gas such as, for example, Ar or $N_2$.

The layered silicate is obtained in the form of a crystalline, hygroscopic solid after the crucible has been broken open.

In the case of synthesis in an open crucible system, there is preferably used a glass stage of the general composition $wSiO_2.xM^a.yM^b.zM^c$, wherein $5<w<7$; $0<x<4$; $0 \leq y<2$; $0 \leq z<1.5$ and $M^a$, $M^b$, $M^c$ are metal oxides and $M^a$ is other than $M^b$ is other than $M^c$.

$M^a$, $M^b$, $M^c$ independently of one another can be metal oxides, preferably $Li_2O$, $Na_2O$, $K_2O$, $Rb_2O$, $MgO$, particularly preferably $Li_2O$, $Na_2O$, $MgO$. $M^a$ is other than $M^b$ is other than $M^c$.

The glass stage is prepared in the desired stoichiometry from the desired salts, preferably the carbonates, particularly preferably $Li_2CO_3$, $Na_2CO_3$, and a silicon source such as, for example, silicon oxides, preferably silica. The pulverulent constituents are converted into a glassy state by heating and rapid cooling. The conversion is carried out preferably at from 900 to 1500° C., particularly preferably at from 1000 to 1300° C. The heating phase in the preparation of the glass stage lasts from 10 to 360 minutes, preferably from 30 to 120 minutes, particularly preferably from 40 to 90 minutes. This procedure is typically carried out in a glassy carbon crucible under a protected atmosphere and/or reduced pressure by means of high-frequency induction heating. The reduction of the temperature to room temperature is carried out by switching off the furnace. The resulting glass stage is then finely ground, which can be carried out, for example, by means of a powder mill.

Further reactants are added to the glass stage in a weight ratio of from 10:1 to 1:10 in order to achieve the desired stoichiometry. Ratios of from 5:1 to 1:5 are preferred. If necessary, an excess of the readily volatile additives of up to 10% can be added. These are, for example, alkali or alkaline earth compounds and/or silicon compounds. Preference is given to the use of light alkali and/or alkaline earth fluorides as well as the carbonates and oxides thereof, as well as silicon oxides. Preference is given to the use of NaF, $MgF_2$, LiF and/or an annealed mixture of $MgCO_3Mg(OH)_2$ and silica.

The mixture is then heated above the melting temperature of the eutectic of the compounds used, preferably to from 900 to 1500° C., particularly preferably to from 1100 to 1400° C. The heating phase lasts preferably from 1 to 240 minutes, particularly preferably from 5 to 30 minutes. Heating is carried out at a heating rate of from 50 to 500° C./minute, preferably at the maximum possible heating rate of the furnace. Cooling after the heating phase to room temperature is carried out at a rate of from 1 to 500° C./minute, preferably in an uncontrolled manner by switching off the furnace. The product is obtained in the form of a crystalline, hygroscopic solid.

The synthesis is typically carried out in a glassy carbon crucible or a graphite crucible under an inert atmosphere. Heating is typically carried out by high-frequency induction.

The described process is substantially more economical owing to the energy-efficient heating by high-frequency induction, the use of inexpensive starting compounds (a high degree of purity is not required, pre-drying of the starting materials is not required, broader range of starting materials such as, for example, advantageous carbonates) and a greatly shortened synthesis time as compared with synthesis in a closed crucible system and the possibility of multiple use of the crucible. High-temperature melt synthesis in an open crucible system is therefore particularly preferred.

The silicates can be annealed in gas-tight crucibles at temperatures between 800° C. and 1200° C. More preferably in range between 1000° C. and 1100° C. for one to 100 days.

Layer charge reduction of as-synthesized silicates can be carried out by ion-exchange with $Mg^{2+}$ and heating at 150° C. to 400° C. for 3 h to 48 h, most preferably at 250° C. for 24 h.

The layered silicates produced as lined out above and the naturally occurring layered silicates can be characterized by general means known to one of skill in the art. Particularly, the following methods were used, which are further detailed in the experimental section of the specification.

As explained above, the process according to the present invention is particularly suitable for delaminating layered silicates having a heterogeneous layer charge distribution or mixtures of layered silicates possessing different layer charges. The differences of layer charges within the to be treated layered silicate or mixture of layered silicates $\Delta L_c$ is preferably up to 0.7, or generally up to 0.5 or particularly up to 0.3 or up to 0.2

The layer charge $L_c$ of the layered silicates was determined according to Lagaly (see A. R. Mermut, G. Lagaly, Clays Clay Miner. 2001, 49, 393-397)

The layer charge $L_c$ can be calculated from the cation exchange capacity and the molecular weight, both determined as lined out above, by means of the following formula (II):

$$L_c = (CEC[\text{mval}/100g] * Mw[g/mol])/(100,000[\text{meal}]) \qquad \text{(II)}$$

The charge equivalent area $A_s$ of the layered silicate can be determined according to the following formula (III)

$$A_s = 47.6 \text{Å}^2/(2L_c) \quad \text{(III)},$$

wherein $L_c$ is the layer charge as determined above.

Delamination Agent

The delamination agents as used in the process according to the present invention are compounds fulfilling the following requirements.

As a first chemical requirement, the delamination agent contains exactly one positively charged atom, the positively charged atom being selected from the group consisting of nitrogen and phosphorous. Preferably the positively charged atom is the nitrogen atom of a protonated or quaternized amino group or a phosphorous atom in a phosphonium group, most preferably the positively charged atom being a nitrogen atom.

A second chemical requirement is that the delamination agent contains a number of $n_f=3$ to 10, preferably 3 to 8, more preferred 3 to 6 and most preferred 3 to 5 functional groups selected from the group consisting of the following four types of groups: hydroxyl groups, ether groups, sulfonic acid ester groups and carboxylic acid ester groups. Amongst the afore-mentioned groups, hydroxyl groups, ether groups and carboxylic acid ester groups are preferred, amongst which hydroxyl and ether groups are even more preferred. Most preferred are hydroxyl groups. All ranges for $n_f$ also apply, if only one type of groups, two types of groups or three types of groups are present in the delamination agent. The functional groups guarantee a minimum extent of hydrophilicity of the delamination agent beside the positively charged atom of the above first chemical requirement.

A third chemical requirement is that the delamination agent comprises a total number of carbon atoms $n_c$ being from 4 to 12, preferably 4 to 10, more preferably 5 to 9 and most preferably 5 to 7, particularly preferred 6 or 7. The total number of carbon atoms also includes such carbon atoms present in the above functional groups, such as the carbon atoms of a carboxylic acid ester group.

The delamination agent has, as the fourth chemical requirement, a ratio $n_c/(1+n_f)$ from 1 to 2, preferably from 1 to 1.8, more preferred from 1 to 1.5 and even further preferred from 1 to 1.3 wherein $n_c$ is the total number of carbon atoms of the delamination agent and $n_f$ is the total number of functional groups in the delamination agent as defined above.

Finally, as a sterical requirement (fifth requirement) the delamination agent contains $n_t$ atoms selected from the group consisting of carbon, nitrogen, phosphorous, oxygen and sulfur, $n_t$ being $\geq 9$, more preferred $n_t \geq 11$ and most preferred $n_t \geq 12$.

Each of the afore-mentioned four chemical requirements and the one sterical requirement can be realized independently of the other requirements in form of its preferred, more and most preferred and even further preferred embodiments as long as the fourth and fifth requirement are accomplishable. For example, any mandatory requirement can be combined with a preferred requirement and even a most preferred further requirement.

Amongst the delamination agents fulfilling the afore-mentioned four chemical requirements and one sterical requirement, such delamination agents are preferred in the process of the present invention having a charge equivalent area $A_d$ being from 30 to 90 Å$^2$/charge, which is a further preferred sterical feature.

More preferred the charge equivalent area $A_d$ of the delamination agent is in the range from 35 to 80 Å$^2$ or 40 to 80 Å$^2$ and most preferably in the range from 45 to 70 Å$^2$. $A_d$ is given in Å$^2$/charge.

It was found by the present inventors that delamination agent having an $n_t$ value and/or a charge equivalent area $A_d$ in the above ranges are particularly suitable, even if the layered silicate has a heterogeneous layer charge distribution as is the case for some naturally occurring layered silicates, such as montmorillonites.

The charge equivalent area of the delamination agent $A_d$ is the maximum projection area of the lowest energy conformer, based on the van der Waals radius. It can comfortably be determined online (https://chemicalize.org) or with software solutions as for example provided by ChemAxon Ltd., Budapest Hungary (MarvinSketch (version 6.2.2), calculation module developed by ChemAxon; using the Geometrical Descriptor Plugin of the software, the structure was optimized by the implemented MMFF94 force field; http://www.chemaxon.com/products/marvin/marvinsketch/, 2014).

If the layer charge range ($L_c$ range) of the layered silicate or mixture of layered silicates is known, it is possible to further optimize the process by selecting the delamination agent in view of the charge equivalent area $A_s$ of the layered silicate or mixture of layered silicates to be delaminated. It was found by the present inventors, that it is particularly preferred if the $A_d/A_s$ ratio is from $\geq 0.9$ to 3.0, more preferred in the range of $\geq 0.92$ to 2.5, even more preferred in the range from $\geq 0.92$ to 2.0.

Amongst the suitable delamination agents such delamination agents are most suitable which belong to the group of ionic compounds (i. e. salts), consisting of an anion and a cation, wherein in the cation contains a protonated or quarternized nitrogen atom or a phosphonium group.

If the cation contains a protonated or quaternized nitrogen atom, the protonated or quaternized nitrogen atom is preferably the nitrogen atom of an amino polyol, preferably having at least 3 hydroxyl groups. The amino polyol is even more preferably selected from the group consisting of amino sugars, N-alkyl amino sugars and the same, wherein the C=O functionalities have been reduced to CH—OH functionalities. Suitable examples for amino sugars are e. g. glucosamine, galactosamine, fructosamine and mannosamine; an N-methylated amino sugar is e.g. N-methyl-D-glucamine. Most preferred are glucosamine and N-methyl-D-glucamine, in their protonated or quaternized forms. The anions are preferably halide ions such as chloride or iodide.

Detailed Description of the Process Steps

In a first step, according to the process of the present invention, a layered silicate, is treated with a delamination agent. In this treatment step, the delamination agent is used in an amount which is at least equal to the cation exchange capacity of the layered silicate.

To carry out the treatment step, preferably an aqueous solution of the delamination agent is prepared and the layered silicate is suspended in the aqueous solution of the delamination agent. The concentration of the delamination agent in the aqueous solution is preferably in the range from 0.2 to 2 mol/L, more preferred in the range of 0.5 to 1.5 mol/L. In general the concentration of the delamination agent is chosen to be high enough to prevent a premature delamination of the layered silicate at this stage. The amount of layered silicate is preferably in the range of 1 to 50 g/L, more preferred 5 to 40 g/L and most preferred in the range from 10 to 30 g/L.

Preferably the thus produced suspension is agitated for 5 min to 48 h at a temperature from 1° C. to 100° C. by overhead shaking or stirring. Thus, a not yet delaminated, but delamination agent treated layered silicate is obtained as a suspension. In some cases it might be necessary to repeat this procedure several times, e.g. up to 5 times, to obtain a fully treated layered silicate. Details are given in the example section of the present invention.

Finally, in a second step, the thus treated layered silicate obtained in the first step is contacted with an aqueous medium, preferably of low ionic strength such as purified water, to produce single silicate lamellae.

To carry out the second step, preferably the gel produced as above is concentrated, e.g. by centrifugation (preferably 14 000 g for 40 min); the concentrated gel is preferably resuspended in purified water and centrifuged again. This is repeated until no halide-ions are detectable. This can be monitored by the silver nitrate test. Alternatively, if no concentration of the delaminated clay is necessary, the excess ions can be removed by means of dialysis. The thus obtained product is delaminated and can either be washed with acetone and dried at about 60° C. or freeze-dried from the aqueous medium. A direct drying of the suspension is feasible as well (preferably 80° C.), but takes significantly longer time.

Alternatively, the sample may be directly delaminated by using low ionic strength of the delamination agent in the range of <0.1 mol/L without the need of a washing step.

Further Subjects of the Invention

The invention further provides a delaminated layered silicate, i. e. the delamination product obtained by the process according to the invention.

The invention likewise provides the use of the delamination product according to the invention in the production of a composite material, a coating material, or as a flameproof barrier or as a diffusion barrier.

For example, a dispersion of the delamination product in a polar solvent such as water can be used to apply a flameproof or diffusion barrier to a substrate. To that end, the dispersion can be applied to the substrate and then the solvent can be removed, for example by drying.

The invention further provides a composite material comprising or obtainable by using the delamination product obtained according to the process of the invention.

It is particularly preferred, if the composite material contains a polymer. In order to produce polymer composites, the delamination product can in particular be incorporated into any conventional polymers which have been produced by polycondensation, polyaddition, radical polymerisation, ionic polymerisation and copolymerisation. Examples of such polymers are polyurethanes, polycarbonate, polyamide, PMMA, polyesters, polyolefins, rubber, polysiloxanes, EVOH, polylactides, polystyrene, PEO, PPO, PAN, polyepoxides. Incorporation into polymers can be carried out by means of conventional techniques such as, for example, extrusion, kneading processes, rotor-stator processes (Dispermat, Ultra-Turrax, etc.), grinding processes or jet dispersion and is dependent on the viscosity of the polymers.

In the following the invention is further explained by means of examples.

Examples

Preparation of Synthetic Layered Silicates by Melt Synthesis

Preparation of $[Na_{0.75}]^{inter}[Mg_{2.25}Li_{0.25}]^{octa}[Si_4]^{tetra}O_{10}F_2$ (Na075; Vermiculite Type)

For melt synthesis, 4.064 g of NaF (99.995%, Alfa Aesar), 2.511 g of LiF (>99.9%, ChemPur), 2.010 g of $MgF_2$ (>99.9%, ChemPur), 10.402 g of MgO (99.95%, Alfa Aesar) and 31.014 g of $SiO_2$ (Merck, fine granular quartz, purum) are weighed in a molybdenum crucible.

The crucible was sealed gas tight by welding under high-vacuum ($<10^{-4}$ mbar). The crucible was ramped to 1750° C. (15° C./min), held at this temperature for 70 min, cooled to 1300° C. (55° C./min) and to 1050° C. (10° C./min). Finally, it was quenched by switching of the power. The milled powder (mill: Retsch PM 100, 250 turns per minute for 20 minutes) was heated at 250° C. and $<10^{-1}$ mbar, transferred into a molybdenum crucible which was sealed gas tight by welding under high-vacuum ($<10^{-4}$ mbar). To obtain Na075 the crucible was annealed at 1045° C. for 6 weeks.

Preparation of $[Na_{0.50}]^{inter}[Mg_{2.5}Li_{0.5}]^{octa}[Si_4]^{tetra}O_{10}F_2$ (Na050; Hectorite Type)

For melt synthesis, 2.719 g of NaF (99.995%, Alfa Aesar), 1.680 g of LiF (>99.9%, ChemPur), 4.035 g of $MgF_2$ (>99.9%, ChemPur), 10.440 g of MgO (99.95%, Alfa Aesar) and 31.127 g of $SiO_2$ (Merck, fine granular quartz, purum) are weighed in a molybdenum crucible.

The crucible was sealed gas tight by welding under high-vacuum ($<10^{-4}$ mbar). The crucible was ramped to 1750° C. (15° C./min), held at this temperature for 70 min, cooled to 1300° C. (55° C./min) and to 1050° C. (10° C./min). Finally, it was quenched by switching of the power. The milled powder (mill: Retsch PM 100, 250 turns per minute for 20 minutes) was heated at 250° C. and $<10^{-1}$ mbar, transferred into a molybdenum crucible which was sealed gas tight by welding under high-vacuum ($<10^{-4}$ mbar). To obtain Na050 the crucible was annealed at 1045° C. for 6 weeks.

Preparation of Charge Reduced Hectorite (LCR; Hectorite Type)

Clays of low layer charge <0.48 p.f.u. might not be accessible via melt synthesis as described above due to immiscibility gaps. The synthesis of low layer charged clays is carried out by so-called "charge reduction" as follows.

5 g of Na050 were exchanged 7 times with 400 mL of 2 M $MgCl_2$-solution. The resulting Mg-exchanged hectorite was washed with water till chloride test ($AgNO_3$) of the supernatant solution was negative. The slurry was dried at 80° C. The dried powder was heated at 250° C. for 24 h. (Breu et. al., Langmuir 2012, 28, 14713-14719); the obtained sample is named LCR.

Preparation of Further Charge Reduced Hectorite (LCR'; Hectorite Type)

2 g of LCR were exchanged 7 times with 400 mL of 2 M $MgCl_2$-solution. The resulting Mg-exchanged hectorite was washed with water till chloride test ($AgNO_3$) of the supernatant solution was negative. The slurry was dried at 80° C. The dried powder was heated at 250° C. for 24 h. (Breu et. al., Langmuir 2012, 28, 14713-14719); the obtained sample is named LCR'.

Characterization of the Synthetic Layered Silicates

Cation Exchange Capacity (CEC)

The CEC was determined according to DIN EN ISO 11260:2017-04 using barium chloride.

The determined CECs are 185 meq/100 g (Na075), 129 meq/100 g (Na050), 103 meq/100 g (LCR), and 75 meq/100 g (LCR').

Layer Charge Determination According to Lagaly ($L_c$)

The layer charge density per formula unit $Si_4O_{10}F_2$ (p.f.u.) was determined experimentally by the method of Lagaly (see A. R. Mermut, G. Lagaly, Clays Clay Miner.

2001, 49, 393-397) where interlayer ions are exchanged with n-alkylammonium ($C_nH_{2n+1}NH_3^+$). The d-spacing of the resultant intercalation compounds ($d_{001}$) is measured by means of Powder X-ray diffraction (PANalytical X'Pert Pro, Cu K□-radiation).

For these organo-cations the equivalent area per charge is known for a dense packing of either mono- (d=13.3 Å) or bilayers (d=17.6 Å). The onset of the transition of mono- to bilayer- or from bilayer to pseudo-trilayer arrangement with increasing chain length was converted into upper limits of charge densities (per formula unit $Si_4O_{10}F_2$, p.f.u.).

For highly charged Na075 n=9 represents the longest alkyl ammonium chain that is still capable to balance the charge density in a bilayer ($d_{001}$=17.6 Å) and would correspond to a layer charge of 0.73 p.f.u. for a densely packed bilayer. Upon slightly increasing the equivalent area to n=10 some pseudo-trilayers have to be mixed in to warrant charge balance as evidenced by a shift of the d-spacing (d=19.2 Å) which would correspond to a layer charge of 0.67 p.f.u. for a densely packed bilayer. For the sake of simplicity we use the arithmetic mean x=0.70 p.f.u. A flat lying monolayer arrangement with even shorter chains is not feasible for such high layer charges.

In a similar way, for the lower charged clays, the charge densities were derived from the transition of mono- to bi-layers with limiting chain length.

Na050: n=5 (corresponding to x=0.56 p.f.u.) yields $d_{001}$=13.4 Å, n=6 (corresponding to x=0.50 p.f.u.) leads to $d_{001}$=14.2 Å. The layer charge is hence x=0.53 p.f.u.

LCR: n=8 (corresponding to x=0.40 p.f.u.) yields $d_{001}$=13.4 Å, n=9 (corresponding to x=0.36 p.f.u.) leads to $d_{001}$=14.2 Å. The layer charge is hence x=0.385 p.f.u.

Calculation of the Charge Equivalent Area ($A_s$)

The charge equivalent area $A_s$ of the layered silicates can be calculated from their layer charge $L_c$ by using the following formula (III)

$$A_s = 47.6 \text{ Å}^2/(2 L_c) \quad (III),$$

wherein $L_c$ is the layer charge as determined above.

The factor of "2" is due to the circumstance that the $L_c$ is given per formula unit (p.f.u.) of $Si_4O_{10}F_2$ and each unit cell contains 2 formula units.

The multiplier 47.6 Å² results from the typical (a,b)-dimensions of a cell of the layered silicates as used herein (a=5.24 Å and b=9.08 Å) and is used for all layered silicates irrespective of the exact cell dimensions which e.g. can be determined by Powder X-ray diffraction (PXRD) patterns recorded on a STOE Stadi P powder diffractometer using Cu Kai radiation on samples placed in a glass capillary. Prior to measurement the samples are equilibrated for one week over a saturated $K_2CO_3$-solution (43% relative humidity).

The following Table 1 shows the synthetic layered silicates as prepared and characterized above and their characteristics as defined in the present invention.

TABLE 1

| Synthetic Layeres Silicate | $L_c$ | $A_s$ |
|---|---|---|
| Na075 | 0.70 | 34.0 |
| Na050 | 0.495 | 48.1 |
| LCR | 0.385 | 61.8 |

Characterization of the Delamination Agents
Calculation of the Charge Equivalent Area ($A_d$)

The charge equivalent area ($A_d$) of the cationic delamination agents was determined using the Geometrical Descriptor Plugin of the online software (https://chemicalize.org), the structure was then optimized by the implemented MMFF94 force field. By projection optimization the maximum projection area of the lowest energy conformer, based on the van der Waals radius was obtained. This value (in Angstrom-square Å²) was chosen to be $A_d$ of the delamination agent as Å²/charge. By this means, the used organo-cations along with their anion have been drawn with a flat lying conformation. It might be noted, that the anion contributes only negligible to the obtained $A_d$ in case small anions like halide ions are used.

The following Table 2 shows the delamination agents used and their characteristics as defined in the present invention.

TABLE 2

| Delamination Agent | Positively Charged Atom | $n_f$ | $n_c$ | $n_c/(1 + n_f)$ | $n_t$ | $A_d$ |
|---|---|---|---|---|---|---|
| trimethylammoniumethyl methacrylate iodide* | N | 1 | 9 | 4.50 | 12 | 60.4 |
| diethylamino ethanol hydrochloride* | N | 1 | 6 | 3.00 | 9 | 41.1 |
| 2-amino-2-(hydroxy-methyl)-1,3-propanediol hydrochloride* | N | 3 | 4 | 1.00 | 8 | 39.0 |
| glucosamine hydrochloride | N | 5 | 6 | 1.00 | 12 | 56.3 |
| N-methyl-D-glucamine hydrochloride | N | 5 | 7 | 1.17 | 13 | 59.8 |

*not according to the invention

Relation between the Charge Equivalent Areas $A_d$ and $A_s$

In Table 3 the ratio of the charge equivalent areas $A_d$ and $A_s$ is shown.

TABLE 3

| | $A_d/A_s$ | | |
|---|---|---|---|
| Delamination Agent | Na075 | Na050 | LCR |
| trimethylammoniumethyl methacrylate iodide* | 1.78 | 1.26 | 0.98 |
| diethylamino ethanol hydrochloride* | 1.21 | 0.85 | 0.67 |
| 2-amino-2-(hydroxy-methyl)-1,3-propanediol hydrochloride* | 1.15 | 0.81 | 0.63 |
| glucosamine hydrochloride | 1.66 | 1.17 | 0.91 |
| N-methyl-D-glucamine hydrochloride | 1.76 | 1.24 | 0.97 |

*not according to the invention

Process of Delamination According to the Invention
Preparation of Aqueous Solutions of Delamination Agents Diethylamino ethanol (DEA, >99.5%, Aldrich), 2-amino-2-(hydroxymethyl)-1,3-propanediol (TRIS, >99%, Aldrich), N-methyl-D-glucamine (Meglumine, >99.0%, Aldrich) were dissolved in purified water and were titrated to a pH of approximately 8 using HCl (32 wt %) and titrated to pH=7 using 1 M HCl. The solutions were diluted with purified water to yield 1M solutions.

2-(Dimethylamino)ethyl methacrylate (DMAEMA, 98%, Aldrich) was methylated with methyl iodide resulting in trimethylammoniumethyl methacrylate iodide (TMAEMA iodide): DMAEMA (10 g) was dissolved in acetone (1 L) and methyl iodide was added at a molar ratio of 1.5 compared to amino groups. The mixture was stirred overnight. The precipitate was washed several times with acetone and finally dried using high vacuum. Completeness of quaternization was approved by $^1$H-NMR. TMAEMA iodide was dissolved in purified water to yield a 1 M solution.

Glucosamine was readily purchased as a hydrochloride (>99.0%, Aldrich).

Glucosamine hydrochloride was dissolved in water to yield a 1M solution.

Treatment of the Layered Silicate with the Delamination Agent in an Aqueous Medium 10 mL of 1M solution of the delamination agent correspond to the following molar excess of the delamination agent over the cation exchange capacity of the layered silicate: 27-fold (Na075), 39-fold (Na050), 49-fold (LCR), 67-fold (LCR').

200 mg of the respective layered silicate was suspended in 10 mL of a 1 M solution of the delamination agent in water. The procedure was repeated 5 times. After each of the five times, a solid-liquid separation was carried out. The samples were centrifuged (8,000 g; 10 minutes) and the supernatant solution was discarded and replaced by fresh 1 M solution of the delamination agent in water. Finally, the obtained organo clays were washed free of halide ions by washing with purified water, the absence of halide-ions was proven by the well-established silver nitrate test with the separated supernatant solution. Thereby, solid-liquid separation during the washing procedure was carried out by centrifugation (14,000 g; 40 minutes). This reduction of the ionic strength allows osmotic swelling for all suitable delamination agents, thereby leading to the formation of single silicate lamellae and gel formation.

For better further processing, it is possible to separate and wash the thus produced product one time with acetone and to dry it at an elevated temperature, e.g. at 60° C. The obtained solid product can be resuspended in purified water in a larger weight percentage range.

Characterization of Layered Silicates Treated with the Delamination Agent

Characterization of Delaminated Gels by SAXS

Small angle X-ray scattering (SAXS) might be used to determine the d-spacing of a delaminated gel. Typically, due to delamination these d-spacings are >100 Å. SAXS data were measured using a "Double Ganesha AIR" system (SAXSLAB, Denmark). The X-ray source of this laboratory-based system is a rotating anode (copper, MicroMax 007HF, Rigaku Corporation, Japan) providing a micro-focused beam. The data are recorded by a position sensitive detector (PILATUS 300K, Dectris). Samples of delaminated organo-clays were prepared by adding a defined amount of ultrapure water to the dry treated layered silicates, leading to gel-formation. After equilibration for one week SAXS-patterns were recorded in 1 mm glass capillaries. In contrast, non-delaminating samples do not form gels: upon addition of water the non-delaminating organo-clay forms sediment. In that case the position of the capillary was adjusted to ensure the sediment to be in the beam focus during the measurement. The d-spacing of non-delaminated organo-clays is basically independent on the solid content of the sample, in contrast to delaminating organo-clays, were the solid content of such gel-like suspensions determines the d-spacing. The results are shown in Table 4. The percentage values given in round brackets are the amounts of treated layered silicate in the respective suspensions.

TABLE 4

| | $d_{001}$-spacing (SAXS) | | |
|---|---|---|---|
| Delamination Agent | Na075 ($L_c$ = 0.71) | Na050 ($L_c$ = 0.50) | LCR ($L_c$ = 0.39) |
| trimethylammoniumethyl methacrylate iodide | 187 Å (23 wt %) | 16.8 Å (20 wt %) | 14.0 Å (20 wt %) |
| diethylamino ethanol hydrochloride | 131 Å (20 wt %) | 13.6 Å (20 wt %) | 13.6 Å (20 wt %) |
| 2-amino-2-(hydroxy-methyl)-1,3-propanediol hydrochloride | 150 Å (20 wt %) | 13.9 Å (20 wt %) | 13.9 Å (20 wt %) |
| glucosamine hydrochloride | 138 Å (20 wt %) | 129 Å (20 wt %) | 125 Å (20 wt %) |
| N-methyl-D-glucamine hydrochloride | 140 Å (20 wt %) | 132 Å (19 wt %) | 133 Å (19 wt %) |

As shown in the following Table 5 (Delamination Chart), which is in accordance with the above Table 4, only the delamination agents fulfilling all mandatory requirements as set out above, showed a delamination of the respective layered silicates ("+") over a broad range of layer charges, while the other delamination agents partially failed ("−").

TABLE 5

| | Delamination Chart | | |
|---|---|---|---|
| Delamination Agent | Na075 ($L_c$ = 0.71) | Na050 ($L_c$ = 0.50) | LCR ($L_c$ = 0.39) |
| trimethylammoniumethyl methacrylate iodide* | + | − | − |
| diethylamino ethanol hydrochloride* | + | − | − |
| 2-amino-2-(hydroxy-methyl)-1,3-propanediol hydrochloride* | + | − | − |
| glucosamine hydrochloride | + | + | + |
| N-methyl-D-glucamine hydrochloride | + | + | + |

*not according to the invention

Furthermore, LCR was used to produce a further charge reduced layered silicate LCR' by further ion exchange with MgCl$_2$ by repeating the ion exchange procedure in the same manner as described above. The thus obtained LCR' had a layer charge $L_c$ of 0.30 corresponding to a charge equivalent area $A_s$ of 79.3 Å$^2$/charge. Even this layered silicate was delaminated by glucosamine hydrochloride and N-methyl-D-glucamine hydrochloride, which fulfill the mandatory requirements on a universal delamination agent as set out above.

This finding is also particularly interesting for layered silicates having a heterogeneous distribution of layer charges in the material. Therefore, for layered silicates, which are known to possess a heterogeneous distribution of layer charges, it is most preferable to use the delamination agents as defined above. The same applies for mixtures of charge homogeneous layered silicates of different charge densities.

The invention claimed is:

1. A process for delamination of a layered silicate in an aqueous medium, the process comprising:
   treating a layered silicate with an amount of a delamination agent, the amount of the delamination agent being at least equal to the cation exchange capacity of the layered silicate; and
   contacting the treated layered silicate with an aqueous medium, wherein the delamination agent
   i. is a compound having exactly one positively charged atom, the positively charged atom being nitrogen or phosphorous;
   ii. contains $n_f$ functional groups including any one or more of a hydroxyl group, an ether group, a sulfonic acid ester group, or a carboxylic acid ester group, $n_f$ being a number from 3 to 10;
   iii. comprises a total number of carbon atoms $n_c$ being from 4 to 12;
   iv. has a ratio $n_c/(1+n_f)$ from 1 to 2, and
   v. including any one or more of carbon, nitrogen, phosphorous, oxygen, or sulfur, $n_t$ being greater than or equal to 9
wherein the layered silicate is represented by general formula (I)

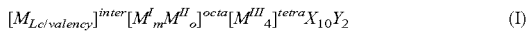 (I)

wherein,
M represents metal cations of oxidation state 1 to 3;
$M^I$ represents metal cations of oxidation state 2 or 3;
$M^{II}$ represents metal cations of oxidation state 1 or 2;
$M^{III}$ represents atoms of oxidation state 4;
X represents di-anions;
Y represents mono-anions;
m is less than or equal to 2.0 for metal atoms $M^I$ of oxidation state 3;
m is less than or equal to 3.0 for metal atoms $M^I$ of oxidation state 2; and
o is less than or equal to 1.0.

2. The process according to claim 1, wherein the layered silicate is a synthetic or naturally occurring 2:1 clay mineral.

3. The process according to claim 1, wherein the layered silicate is a smectite or vermiculite.

4. The process according to claim 1, wherein
M independently represent $Li^+$, $Na^+$, or $Mg^{2+}$;
$M^I$ independently represent $Mg^{2+}$, $Al^{3+}$, $Fe^{2+}$, or $Fe^{3+}$;
$M^{II}$ independently represent $Li^+$ or $Mg^{2+}$;
$M^{III}$ is a tetravalent silicon cation;
X is $O^{2-}$;
Y independently represent $OH^-$, or $F^-$.

5. The process according to claim 1, wherein
the delamination agent
   ii. contains 3 to 8 of the of functional groups; and/or
   iii. comprises 4 to 10 of the total number of carbon atoms $n_c$; and/or
   iv. has the ratio $n_c/(1+n_f)$ from 1 to 1.8; and/or
   v. contains 10 or more of the $n_t$ atoms.

6. The process according to claim 1, wherein
the delamination agent
   i. is a compound having exactly one positively charged nitrogen atom; and/or
   ii. contains 3 to 6 of the of functional groups, the of functional groups including any one or more of a hydroxyl group or an ether group; and/or
   iii. comprises 5 to 9 of the total number of carbon atoms $n_c$; and/or
   iv. has the ratio $n_c/(1+n_f)$ from 1 to 1.5; and/or
   v. contains 11 or more of the $n_t$ atoms.

7. The process according to claim 1, wherein treating the layered silicate with the amount of the delamination agent includes treating the layered silicate with an aqueous solution of the delamination agent, wherein the concentration of the delamination agent in the aqueous solution is high enough to prevent delamination of the layered silicate while treating the layered silicate with the amount of the delamination agent.

8. The process according to claim 7, wherein the concentration of the delamination agent in the aqueous solution is from 0.2 to 2 mol/L.

9. The process according to claim 7, wherein the concentration of the layered silicate in the aqueous solution containing the delamination agent is in the range from 1 to 50 g/L.

10. The process according to claim 1, wherein when contacting the treated layered silicate with the aqueous medium, the aqueous medium has an ionic strength low enough to cause delamination of the treated layered silicate.

11. The process according to claim 1, wherein the aqueous medium includes water.

12. The process according to claim 4, wherein the layer charge $L_c$ is greater than or equal to 0.28 and less than or equal to 0.95.

13. The process according to claim 7, wherein the concentration of the delamination agent in the aqueous solution is in the range of 0.5 to 1.5 mol/L.

14. The process according to claim 7, wherein the concentration of the layered silicate in the aqueous solution containing the delamination agent is in the range from 5 to 40 g/L.

15. The process according to claim 7, wherein the concentration of the layered silicate in the aqueous solution containing the delamination agent is in the range from 10 to 30 g/L.

16. The process according to claim 11, wherein the water is purified water.

* * * * *